United States Patent
Breton

(10) Patent No.: US 10,591,294 B1
(45) Date of Patent: Mar. 17, 2020

(54) REAL-TIME ROAD GRADE, SLOPE AND ELEVATION MEASUREMENT USING DIFFERENTIAL PRESSURE APPARATUS AND METHOD

(71) Applicant: Horiba Instruments Incorporated, Irvine, CA (US)

(72) Inventor: Leo Alphonse Gerard Breton, Washington, DC (US)

(73) Assignee: Horiba Instruments Incorporated, Irvine, CA (US)

( * ) Notice: Subject to any disclaimer, the term of this patent is extended or adjusted under 35 U.S.C. 154(b) by 6 days.

(21) Appl. No.: 16/120,018

(22) Filed: Aug. 31, 2018

(51) Int. Cl.
  *G01C 5/06* (2006.01)
  *G01L 13/00* (2006.01)
  *G05B 19/042* (2006.01)
(52) U.S. Cl.
  CPC .............. *G01C 5/06* (2013.01); *G01L 13/00* (2013.01); *G05B 19/042* (2013.01); *G05B 2219/2637* (2013.01)

(58) Field of Classification Search
  CPC ................................. G01C 5/06; G01L 13/00
  See application file for complete search history.

(56) References Cited

U.S. PATENT DOCUMENTS

2016/0281460 A1* 9/2016 Wang ..................... E21B 47/06

* cited by examiner

*Primary Examiner* — Jamel E Williams
(74) *Attorney, Agent, or Firm* — Brooks Kushman P.C.

(57) ABSTRACT

An apparatus includes a hermitically sealed rigid vessel, a differential pressure sensor, and a controller. The differential pressure sensor measures a difference between ambient pressure in a vicinity of the vessel and internal pressure in the vessel, and outputs a signal indicative of the difference. The controller computes a change in elevation of the apparatus between a first location and a second location based on a value of the signal associated with the first location and a value of the signal associated with the second location.

20 Claims, 4 Drawing Sheets

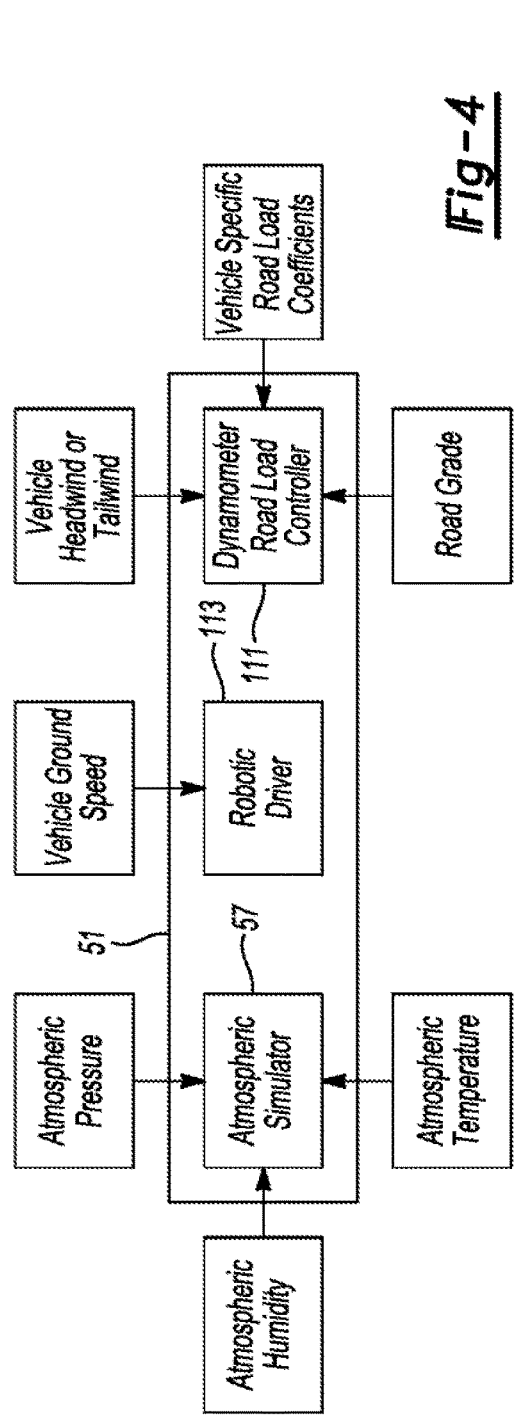
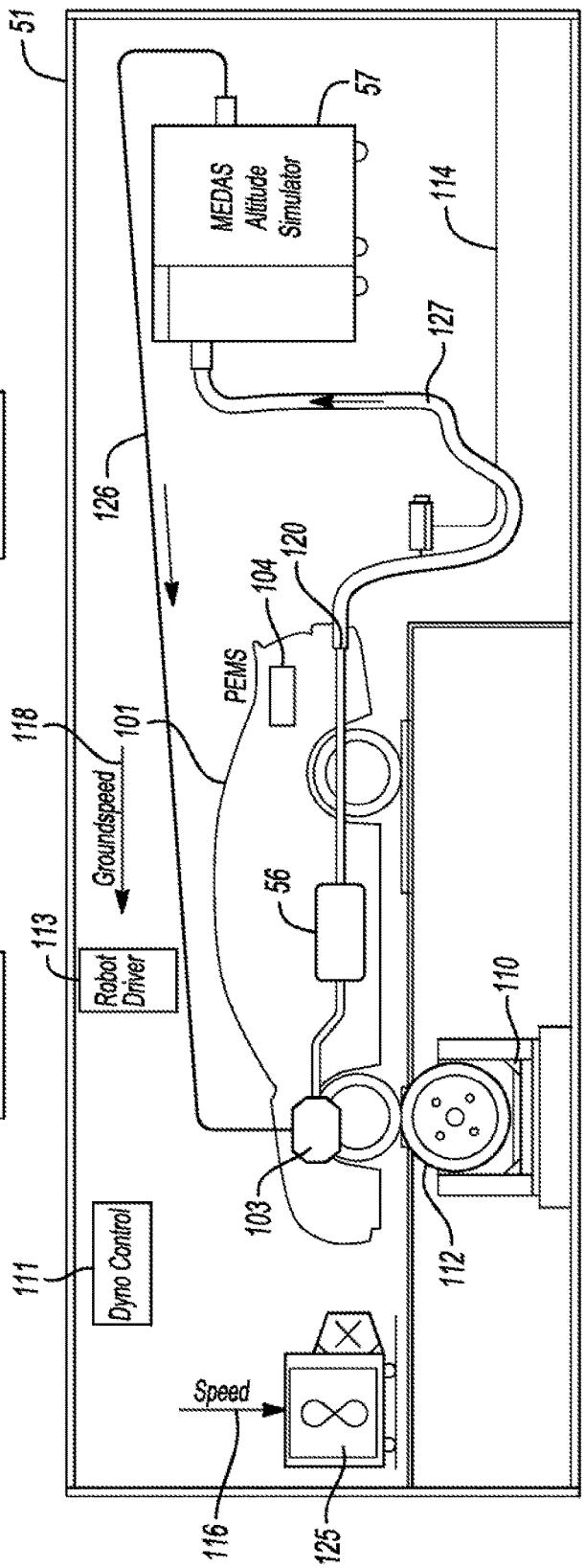

REAL-TIME ROAD GRADE, SLOPE AND ELEVATION MEASUREMENT USING DIFFERENTIAL PRESSURE APPARATUS AND METHOD

TECHNICAL FIELD

The present disclosure is in the field of true slope and true elevation or altitude measurement, and measuring highway and railway road grades and elevations. Resulting real-world measurements can be used for many purposes, many of which are related to vehicle control systems, vehicle emissions, performance, energy efficiency testing, vehicle navigation systems, and populating the databases of moving maps used by vehicle navigation systems. Other uses include, but are not limited to, improved methods of road and railway construction, maintenance, and operational safety.

BACKGROUND

Road grade can be simply defined as the instantaneous change in real or true vertical displacement (i.e. change in true elevation) per instantaneous change in horizontal displacement, over a given time interval, expressed as a percent. While this parameter is conceptually simple to calculate and understand, it is very difficult to measure accurately, in real-time, at high frequency by previously known methods using known apparatuses. For example, while a Global Positioning System (GPS) receiver can be used to acquire both of the needed variables—the change in true elevation as well as the change in horizontal displacement in traveling from one geographic location to another, instantaneous measurements of small elevation changes are very inaccurate using the GPS receivers that are available for civilian use. High resolution measurements needed for real-time measurement of undulating roadways and changing road grades typically found in the real world require the ability to accurately sense very small changes in true elevation. For example, climbing or descending an 8% road grade, which is a relatively steep road, results in a vertical velocity of only 0.5 m/s for a horizontal speed of 25 kilometers per hour. And railway grades are usually much smaller than this.

Although accurate elevation measurement is not needed for accurate road grade measurement (i.e. accurate elevation change and horizontal displacement change over the same time interval are what is needed), the present disclosure also teaches how to accurately determine true elevation in real-time.

Laboratory-based tailpipe emissions testing has been historically performed under a limited range of ambient conditions, vehicle speed cycles, and driving conditions. Because the number of vehicles has increased dramatically in recent years worldwide, and because vehicles have become increasingly computer-controlled, it has become necessary for government regulators and automobile manufacturers to better understand the emissions of vehicles across a wider range of operating conditions so that National Ambient Air Quality (NAAQ) standards can continue to be met in current ambient air pollution "attainment areas" and can eventually be met in current "non-attainment areas." It has also become advantageous for vehicle manufacturers to be able to assess the effects of contemplated changes to vehicle emission control system designs and powertrain calibrations across a wider range of ambient and operating conditions, including road grades.

BEVs may become a significant factor of overall pollution from "stationary sources" in the future if they are produced in increasingly larger numbers because they will get their energy for battery charging from the power grid, which may remain heavily dependent on fossil fuels for power generation in the near term. And BEVs typically have a shorter range on a fill charge than a fully-fueled ICE vehicle. Therefore, it is important to understand the energy efficiency of BEVs in real-world driving, including variable road grades, to optimize their control systems, maximize their range, and minimize associated stationary source pollution.

SUMMARY

Here, certain embodiments of the apparatus and method for the accurate and repeatable measurement of real or true elevation and real or true terrain slope or road grade for many purposes are described.

The precise determination of changes in true elevation and horizontal displacement between successive locations in real-time, and elevation changes between an initial geographic location and any subsequent geographic location(s) is enabled by the measurement of an initial ambient pressure at the initial geographic location, the continuous measurement of the pressure difference between atmospheric pressure and a novel containment of an unchanging or fixed reference pressure moved between measurement locations, the measurement of the ambient temperature and humidity at each location, the measurement of horizontal speed, and a new method for continuous, long-term time corrections to account for non-ideal changes in the reference pressure due to small temperature changes and changes in weather over time and changes in location.

The change in true elevation between any two successive geographic locations is determined by the change in the precisely measured difference in the ambient atmospheric pressure, using a low-range differential pressure sensor, in relation to the known relationship between the change in true elevation per change in ambient atmospheric pressure as a function of the actual air density (or other equivalent surrogates for density) at each of the geographic locations. The air density at each location is determined using the measured atmospheric pressure, measured temperature, and measured air humidity at each of the geographic locations. The change in horizontal displacement between the same two successive geographic locations is determined using one of many optional means, e.g. by multiplying the surface speed reported by a GPS receiver by the elapsed time in traveling between the two points. In the case of a modern automobile or heavy-duty truck, it can also be determined by using the reported speed from the On-Board Diagnostics (OBD) port or similar vehicle interface. True terrain slope or road grade is then calculated by dividing the change in true elevation by the change in horizontal displacement and expressing the result as a percentage.

The change in true elevation between any two arbitrary geographic locations is determined by the sum of all of the successive changes in elevation between successive pairs of geographic locations as described above. By adding a starting true elevation, if known, or otherwise determining a starting true elevation using a GPS receiver or by any other means, the true elevation at any later time is determined by adding the starting true elevation and the sum of all the successive changes in true elevation determined in traveling between the two arbitrary locations.

The above method would be path independent in both space and time if there was no change in weather in either space or time. Since there are changes in weather in both space and time, over large enough spans, a correction accounting for changes in atmospheric pressure due to changes in atmospheric conditions in the air column above the measurement point is continuously calculated and applied. In the case of using a GPS receiver, this correction is determined by a statistical method applied to a selected subset of GPS receiver reported elevation data meeting either operator-selected or default criteria.

BRIEF DESCRIPTION OF THE DRAWINGS

FIG. 4 shows how emissions laboratory testing apparatuses can be controlled to simulate real world testing conditions, including the effects of road grade and ambient air conditions.

FIG. 5 represents a vehicle being tested in an emissions laboratory while real-world conditions, including road grade and ambient air conditions are being simulated in real time.

DETAILED DESCRIPTION

Figure 1:
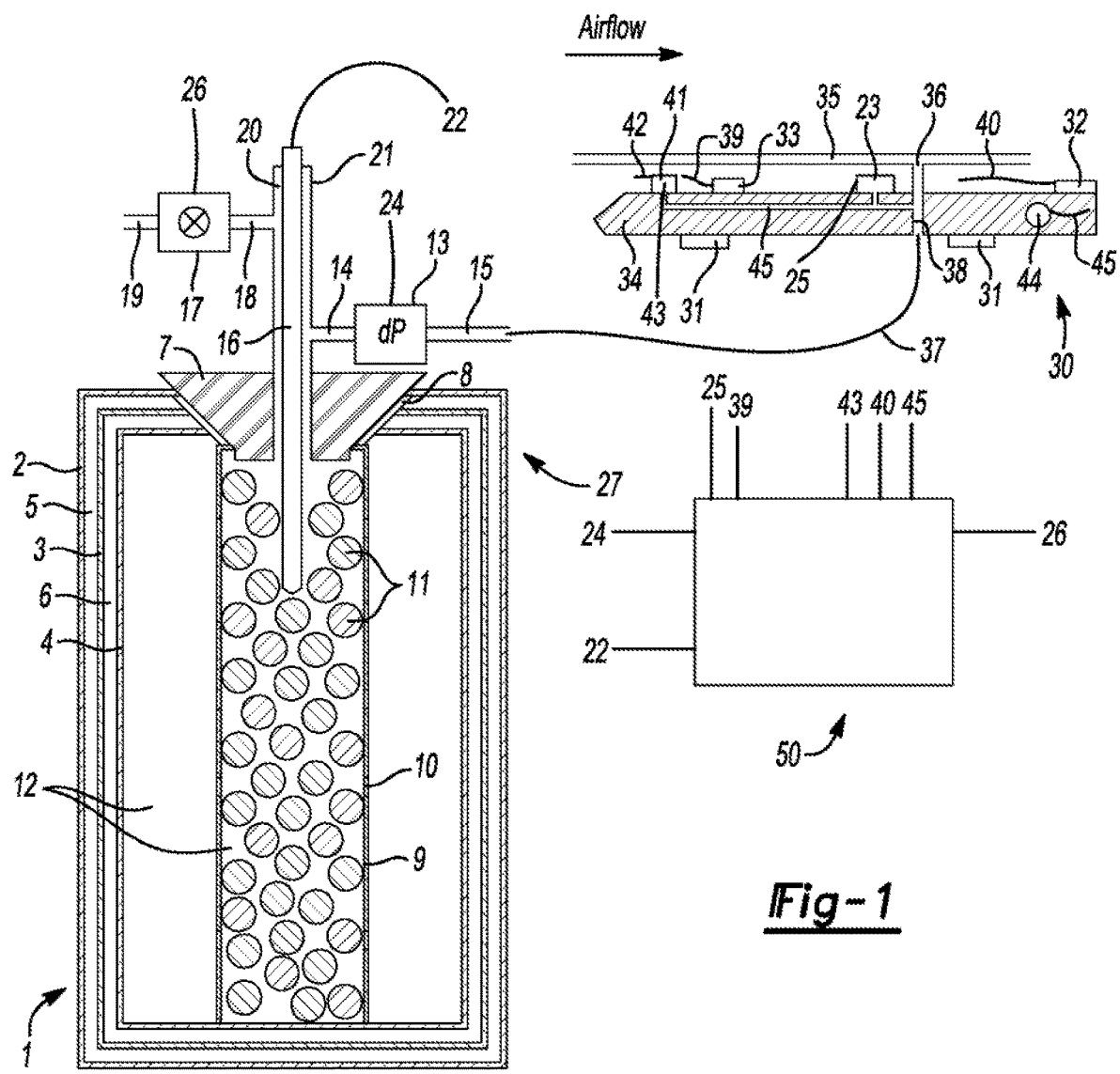
FIG. 1 shows an apparatus for creating and maintaining a stable, internal reference air pressure, a weather station including novel static air pressure sensing port design, an air speed measurement means, a GPS receiver, and a calculating means for calculating true road grade, true elevation, and the magnitude of any headwind or tailwind wind component in real-time.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Determining an approximate elevation or an altitude value as a function of atmospheric pressure has been done for many years and is an important process in the field of aviation for both pilots and Air Traffic Control (ATC) systems worldwide. In fact, an altimeter is essentially a barometer, responding to atmospheric pressure, with a scale referencing an agreed-upon "standard atmosphere" altitude vs. air pressure relationship, and an adjustable zero point which a pilot periodically adjusts according to the most recently published "altimeter setting" value for the closest airport en route. But an altimeter only indicates the true elevation of the subject aircraft if the real atmosphere above the aircraft matches the "standard atmosphere" convention, i.e. the elevation corresponding to the measured atmospheric pressure of the real atmosphere is true elevation only when atmospheric pressure follows the "standard atmosphere" model.

The altitude shown by a properly set aircraft altimeter is known as "indicated altitude." Even though the real atmosphere is never the same as the standard atmosphere, indicated altitude is sufficient for aviation air traffic control purposes because all pilots and ATC procedures adhere to this measurement convention. In other words, even though the altitudes or elevations based on the standard atmosphere are not true altitudes, all pilots and ATC personnel use the same "erroneous" indicated altitude which is sufficient to maintain separation of aircraft abiding by the same established procedures. And when operating near ground levels, separation with ground obstacles is assured because pilots are required to properly zero their altimeters using the "altimeter setting" for the closest airport or reporting station, thereby ensuring that indicated altitude continuously approaches true altitude as an aircraft descends to an airport's elevation, i.e. approaches ground level. In fact, by following the established procedures, an altimeter is set to true altitude at all airport elevations.

Although indicated altitude measurements are sufficient to maintain aircraft separations and separations with ground obstacles for aviation purposes, indicated altitudes are not sufficient for determining true altitudes or elevations and changes in indicated altitudes are not sufficient for accurately determining terrain slopes, road grades, or railroad grades. Terrain slopes and road grades are real parameters which do not change with time or weather conditions and therefore do not depend upon atmospheric conditions. Therefore, changes in atmospheric pressure measurements must be correctly related to changes in true elevation for a pressure-based terrain slope and road grade measurement systems to report correct values.

To measure true terrain slope or real-time true road grade in hilly terrain from on-board a slowly moving vehicle traversing shallow grades, it may be advantageous to be able to accurately measure very small changes in atmospheric pressure between successive measurements. And to measure terrain slope or real-time true road grade in hilly terrain from on-board a quickly moving vehicle, or one traversing steep grades, it may be advantageous to be able to perform accurate measurements at high speed, e.g. 5 Hz or more. An apparatus capable of accurate measurements in both cases is shown in FIG. 1.

FIG. 1 shows a reference pressure means 27, a weather parameter measurement means 30 (i.e. a weather station), and a computing means 50. The reference pressure means 27 comprises a rigid, sealed, constant-volume, adiabatic, high heat capacity, constant pressure vessel 1 which serves to contain and maintain a constant reference air 12 pressure as time and location of the measurement system both change. The reference air 12 volume is contained by rigid stainless steel walls 2, 3, and 4, rigid rubber sealing stopper 7 for sealing against the mouth 8 of the pressure vessel 1, with integral pressure port stem 21, thermocouple 16 with signal output wire 22, automatically controlled venting valve 17 with control wire 26, and pressure port 14 for connecting with the low-range differential pressure sensor 13 having signal output wire 24. A plastic sleeve 9 with holes 10 smaller than the steel ball bearings 11 serves to contain the steel ball bearings 11 which possess high heat capacity while also allowing air in the spaces between the bearings 11 and outside the sleeve 9 to freely mix, thereby maintaining an isothermal and isobaric reference pressure. The vacuum gaps 5, 6 between the rigid walls 2, 3, 4 are evacuated to form a vacuum thermal insulation as is well known in the manufacture of vacuum dewars and thermos bottles.

An automatically controlled venting valve 17 allows a low range differential pressure sensor 13 to be used for maximum accuracy and sensitivity to the small pressure differences experienced in high frequency measurements over typical terrain slopes and grades. The venting valve 17 allows the pressure vessel 1 to be vented (reduced or increased) to the atmosphere whenever the differential pressure sensed by the differential pressure sensor 13 approaches a full-scale value either above or below static ambient pressure. The venting valve 17 is also used to vent the pressure vessel 1 prior to making any true elevation or grade measurements, thereby causing the reference pressure contained by the pressure vessel 1 to be approximately equal to the ambient atmospheric pressure at its location. As true elevation or grade measurements are conducted continuously, the venting valve 17 is programmatically opened and subsequently closed as necessary, to allow the reference air 12 pressure within the reference pressure vessel 1 to reach a value approximately equal to ambient atmospheric pressure, thereby preventing the differential pressure sensed by the differential pressure sensor 13 from exceeding the full scale or specified design value.

Because the reference pressure vessel 1 is rigid, it has a constant volume. Therefore, the internal pressure does not change with changing external atmospheric pressure changes due to changes in either elevation or normal weather conditions. Because the reference pressure vessel 1 is well-insulated thermally, with two near-vacuum gaps surrounding the interior volume, and possessing an insulating rubber stopper 7 above, temperature differences between the reference air 12 temperature and the reference pressure vessel 1 surroundings do not lead to a substantial heat transfer rate. Furthermore, the high heat capacity of the steel ball bearings 11 acts as a heat sink and prevents the small amount of heat transfer that might actually occur from resulting in a large temperature change of the reference air 12 temperature over time. In effect, the reference pressure vessel 1 contains a stable, constant reference pressure of a magnitude approximately equal to the atmospheric pressure surrounding it whenever it is vented using the venting valve 17. Any small changes in reference pressure caused by the fact that there is some small amount of heat transfer with the vessel 1 surroundings is accurately quantified by simultaneously measuring the reference pressure vessel 1 air temperature using the provided thermocouple 16 or other temperature measurement means.

By continuously maintaining a reference pressure nearly equal to an initially taken ambient atmospheric pressure as time and/or location change, very small atmospheric pressure changes due to changes in location or weather can be accurately measured using a very low range (e.g. 0-10" $H_2O$, 0-1" $H_2O$, or lower) differential pressure sensor 13. And small changes in reference air 12 pressure that inevitably occur because of small changes in reference air 12 temperature due to low level heat transfer with the external environment after long periods of time, which are unavoidable, are compensated for by continuously monitoring the internal air 12 temperature using the thermocouple 16, or other suitable temperature sensing means, and by applying the "ideal gas law." The absolute pressure of the reference air 12 is continuously and precisely calculated by the correcting the initial reference pressure for any measured temperature change of the internal air 12 as described below.

Accurately sensing static atmospheric pressure and providing a stable, correct static pressure to the differential pressure sensor 13 is necessary for comparing the static pressure to the reference air 12 pressure contained in the reference pressure vessel 1. Because it is desirable to measure very small changes in differential pressure, and because wind, passing vehicles, dynamic pressure or ram effects, and other atmospheric disturbances can create erroneous responses in sensed static pressure, the design of the static pressure sensing port subsystem of the weather station 30 may be of utmost importance.

The mobile weather station 30 with integral static pressure sensing port 38 subsystem is mounted remotely and external to the subject vehicle to prevent all of the errors associated with the potential pressure disturbances listed above. The carrier structure 34 with magnetic mounts 31 can be a small platform for conveniently supporting the open interior sensing tube 35, a GPS antenna/receiver 32, an ambient air temperature sensor 33, an airspeed differential pressure sensor 41 with a dynamic pressure port 42, the small static pressure port passages 36, 38 conducting the static pressure through the flexible hose 37 to the differential pressure sensor 13 and the pressure sensor 23 sensing port. The carrier structure 34 also supports the internal static pressure passage 45 for providing static pressure to the airspeed differential pressure sensor 41, the absolute pressure or barometric sensor 23, and the ambient air humidity sensor 44.

The dynamic air pressure port 42 is connected to the high-pressure side of the airspeed differential pressure sensor 41 and functions to provide a ram air pressure to the differential pressure sensor 41. The pressure port 42 is pointed in the direction of the front of the vehicle so it points in the upstream direction while the vehicle is moving forward. Thus, the differential pressure sensed by the differential pressure sensor 41 serves to indicate the velocity of the subject vehicle relative to the surrounding air as well known in the art of pitot tube fluid velocity measurements. By separately sensing the ground speed $v_i$ of the subject vehicle by any means, for example by using of a GPS receiver 32 as described below, the wind velocity component (i.e. headwind or tailwind) in the direction of travel can be determined by the difference, i.e. the headwind component, $v_h$ is given by the simplified Bernoulli equation:

$$v_h = \left(2 * \frac{dP_{vdi}}{\rho_i}\right)^{1/2} - v_i, \qquad \text{[Equation 1]}$$

where $dP_{sdi}$ is the instantaneous pressure differential between the stagnation pressure sensed in the dynamic pressure port 42 and the static pressure sensed from the static port 38, via the static pressure passage 45, and indicated by the airspeed differential pressure sensor 41, $\rho_i$ is the air density surrounding the vehicle at the same instant and calculated as described below, and $v_i$ is the vehicle ground speed, measurement of which is also described below.

The headwind speed component $v_h$ in Equation 1 is a valuable parameter for subsequently replicating a real road drive in a laboratory setting using a dynamometer for applying a simulated load on the subject vehicle.

Sensing tube 35 is a hollow tube oriented so that it is parallel to the direction of motion, e.g. along the length of the vehicle when measuring road grade, i.e. approximately parallel to the roadway and "pointed" into the resultant airflow created by the motion of the vehicle, as shown in the figure. The sensing tube 35 serves to ensure straight ambient air flow at the location of the static pressure port 38 without creating an undesirable pressure drop along the sensing tube 35 length, which would lead to higher than actual static pressure sensing at the static pressure port 38. The sensing tube 35 also eliminates the possibility of sensing dynamic or ram pressure at the static pressure sensing port 38 location by physically blocking any potential fluid pathway which would result in moving air to either stagnate at the location of the port sensing location, or otherwise create a dynamic pressure component at the static pressure port sensing location 38 because the distance between either one of the openings and the static pressure sensing port precludes a straight line path between either one of the openings and the static pressure sensing port free of encountering the wall of the sensing tube 35. The sensing tube 35 also serves to physically block or shield the sensing port 38 location from dynamic pressure effects associated with other vehicles that pass the subject vehicle in the same direction of travel as the subject vehicle, or in the opposite direction of travel as the subject vehicle.

An alternative embodiment locates the sensing tube 35 internal to the carrier structure 34, which is more compact but less effective in ensuring that air entering the upstream opening of the sensing tube 35 is undisturbed by the body of the subject vehicle, thereby allowing a potential source of error due to wind buffeting or turbulence. The flexible hose 37 connects the static pressure port 38 to the external pressure port 15 of the differential pressure transducer 13.

Another calculation to provide even greater accuracy is performed using the measured airspeed, as calculated above, to make small corrections for any ram pressure effect that may be created by the sensing tube 35 at the location of the static pressure sensing port 38 for high speed vehicle testing, an effect determined through the calibration of the static pressure subsystem in a laboratory environment with simulated wind or through a calibration while properly placed on a moving vehicle on a flat surface or road. For example, low speed calibrations can be done on a ship in smooth waters (constant elevation) and extrapolated to higher speed vehicles or on a vehicle operating on a level test track.

For continuous, real-time measurements of true elevation, true terrain slope, or true road grade, the differential pressure sensor 13, the absolute ambient pressure sensor 23, the temperature sensors 16, 33, the GPS antenna/receiver 32, and the airspeed differential pressure sensor 41 are all communicably connected to, and continuously read by the computing means 50. The differential pressure sensor 13 is connected by connecting wires 24, the ambient pressure sensor 23 is connected by connecting wires 25, the temperature sensors 16, 33 are connected by connecting wires 22, 39, respectively, the GPS antenna/receiver 32 is connected by connecting wires 40, and the airspeed differential pressure sensor 41 is connected by connecting wires 43. The computing device 50 is capable of performing calculations using, but not limited to, signals input using the connecting wires 24, 25, 22, 39, 40, 43. The venting valve 17 is programmatically controlled by the computing device 50 using a set of connecting wires 26.

It should be noted that the apparatus, as shown in FIG. 1, is described in its most accurate embodiment. But less precise measurements using fewer system sensors can be made, if desired for simplicity or cost concerns. For example, true road grade measurements and true elevation calculations over short periods of elapsed time are not strongly dependent on the measurement of the reference air 12 temperature because of the small time differences. Therefore, only negligible errors are introduced when sampling at high frequency. But over long periods of time, calculations of true elevation require the minimization of reference air 12 differential pressure measurement errors, even though the automatic calibration feature described below will also eliminate such errors. For some purposes it may be desirable to employ simpler systems, depending on the specific true slope measurements to be made and/or the true elevation application.

Continuous measurement of the true road grade in the case of a moving vehicle and the associated continuous determination of the true elevation will now be described. It should be clear that the same apparatus and procedures can be used for the continuous determination of the elevation of remote locations without mounting the system on a motor vehicle.

To continuously measure true road grade and true elevation, the reference pressure assembly 27 is most conveniently mounted inside a vehicle and the weather station assembly 30 with integral static pressure sensing port 38 is mounted on the roof or other nearly-horizontal surface of a vehicle using the magnetic mounts 31 or other suitable attachment means. The flexible hose 37 connecting the static pressure port 38 to the differential pressure sensor 13 passes through a partially-open window or through another suitable opening in the vehicle body. Alternatively, the weather station assembly 30 with static pressure port assembly 38 could be located inside the vehicle but it would be subject to measuring a changing static pressure when the vehicle's cabin-air fan speed is changed or when a door or window is opened or closed. It should be noted that the subject vehicle could be one that is being emissions tested with a Portable Emissions Measurement System (PEMS) to measure the vehicle's real-world exhaust emissions or fuel economy (e.g. miles per gallon), or it could be any other vehicle for which knowing the true road grades of the roads to be traveled are desired. In the case of a vehicle being emissions tested in the real world, knowledge of true road grade and the headwind or tailwind speed component $v_h$ at a high update rate (e.g. 5 Hz or higher) can be very helpful in understanding the emissions test results, the causes of high emissions or poor fuel economy, and the subsequent simulation of real road drives in the laboratory using a dynamometer set to simulate the effects of those parameters.

Figure 2:
FIG. 2 lists steps S1-S12 of a method for accurately calculating true road grade and true elevation using the apparatus shown in FIG. 1.

Continuous programmatic control of the present road grade measurement system, calculation of road grades and elevation, and the reporting of the results is described below in detail and with reference to the steps outlined in FIG. 2. Once the calculation means program is started, the reference pressure vessel 1 is automatically vented by opening the venting valve 17 for approximately 1 second. This action causes the pressure vessel's internal reference pressure to be set approximately equal to the static atmospheric pressure outside the subject vehicle, thereby resulting in a differential pressure sensor 13 sensing of approximately zero (0) inches of water pressure, the center point of the full range of the differential pressure sensor 13. The user is then prompted (not shown) to either enter a known reference elevation for the current location of the vehicle or to choose to collect an average value of a high quality subset of GPS receiver 32 reported elevation data, as described above, and to stop the GPS receiver elevation averaging function once desired convergence criteria are met or the average elevation reported is acceptable to the user based on monitoring statistical parameters associated with the history of GPS receiver elevation reports. The result of either option is the establishment of the beginning reference true elevation.

The road drive on the desired route is then commenced and continues without further user-interaction with the apparatus until the desired route is completely driven. While the drive is taking place, the following events take place programmatically and at a rate of at least 5 Hz:

The reference air 12 temperature is measured by the temperature sensor 16 within the reference pressure vessel 1 and the measured reference pressure is corrected by calculating what the reference pressure value would be if the current temperature was equal to the starting temperature, thereby accounting for any small changes in pressure due to heat transfer between the internal air 12 within the pressure vessel and its surroundings. This correction is done by applying the ideal gas law, or equation of state, to the measured conditions of the reference air 12 of the reference pressure vessel 1. The ideal gas law states:

$$P_r V_r = n_r R T_r$$

where R is the universal gas constant, and $P_r$, $V_r$, $n_r$, and $T_r$, are the absolute pressure, volume, number of moles, and absolute temperature of the gas, respectively.

Since R is a constant, $n_r$ is constant in the case of a sealed container like the reference pressure vessel 1, and $V_r$ is constant for the case of a rigid container like the reference pressure vessel 1, the quantity $P_r/T_r$ for the air inside the reference pressure vessel 1 must remain constant, independent of temperature changes. Therefore, even though any change in reference pressure inside the reference pressure vessel 1 is undesirable, small changes in reference pressure, $\Delta P_{ri}$, due to the cumulative heat transfer from iteration o to iteration 1, can be accounted for by measuring the reference pressure vessel 1 gas temperature and performing the following calculation:

$$\Delta P_{ri} = P_{ri} - P_{ro} = P_{ro} * \frac{T_i}{T_0} - P_{ro} = P_{ro} * \left(\frac{T_i}{T_0} - 1\right), \quad \text{[Equation 2]}$$

where $P_{ri}$ is the reference pressure during iteration i, based on a starting or initial reference pressure $P_{ro}$ measured during the first iteration o.

The pressure differential $dP_{si}$ between the external static pressure sensed at the static pressure port 38 and the reference pressure vessel 1 reference pressure, sensed by the differential pressure sensor 13 during iteration 1, is continuously updated at 5 Hz, or other desired frequency. The pressure differential $dP'_{si}$ between the external static pressure sensed at the static pressure port 38 during iteration i and the original reference pressure sensed during iteration o is then calculated as:

$$dP'_{si} = dP_{si} + \Delta P_{ri},$$

and it follows that the actual change in external static pressure, from iteration i−1 to iteration i, due to the combined effect of elevation changes and weather changes over time and location, can then be calculated as:

$$\Delta dP'_{si} = dP'_{si} - dP'_{si-1} + \epsilon_{si} \quad \text{[General Formulation—Equation 3]}$$

where $\epsilon_{si}$ is any corrected static pressure contributions caused by changes in weather, i.e. changes in atmospheric conditions, above the measurement point elevation, from iteration i−1 to iteration 1. For consecutive iterations taking place at 5 Hz or higher, $\epsilon_{si}$ is negligible compared with corrected pressure changes caused by meaningful changes in true elevation for a vehicle moving at normal speeds and leading to measurable and meaningful road grade values. Therefore, for purposes of calculating the change in true elevation for subsequent use in continuously calculating road grade measurement, Equation 2 simplifies to $$\Delta P'_{si} = dP'_{si} - dP'_{si-1} \quad \text{[Road Grade Formulation—Equation 4]}$$

Neglecting small changes in the atmosphere above the vehicle elevation between iterations, i.e. changes in weather, the change in static pressure is due almost entirely to the addition or reduction of the weight of the atmosphere above the vehicle elevation, per unit of horizontal area, caused by the vertical decent or ascent of the vehicle, respectively. This change in pressure with elevation can be easily calculated by:

$$\frac{\partial (dP'_{si})}{\partial h} = \rho_i * g,$$

where $$\frac{\partial (dP'_{si})}{\partial h}$$

is the partial derivative of the differential reference pressure corrected for any measured change in reference air 12 temperature, with respect to a change in elevation, g is the gravitational acceleration constant on Earth (9.8 m/s²) and $\rho_i$ is the density of the ambient air through which the vehicle passes in ascending or descending during iteration i, which is calculated according to:

$$\rho_i = \rho_{STP} * \frac{P_i}{P_{STP}} * \frac{T_{STP}}{T_i} * k,$$

where $\rho_{STP}$ denotes the known density of dry air at the conditions of standard temperature and pressure (e.g. 1.225 kg/m³ at a temperature of 15 C and a pressure of 101.325 kPa and), $P_i$ and $T_i$ are the measured atmospheric pressure and temperature, respectively, from the pressure sensor 23 (or the calculated atmospheric pressure based on the starting atmospheric pressure and the changes in measured differential pressure using the differential pressure sensor 13), and the temperature sensor 33, $P_{STP}$ and $T_{STP}$ denote the standard pressure and standard temperature respectively, and k denotes the humidity correction factor to correct for the relative humidity of the air sensed by the relative humidity sensor 44.

k can be estimated by the following formula:

$$k = 1 - 0.378 * RH * C0 * 10^{C1 * \frac{Tc}{C2 + Tc}} / P$$

where RH denotes the percent relative humidity, C0=6.1078, C1=7.5, C2=237.3, Tc is the air temperature in Celsius, and P is the air pressure in Pascals.

But, neglecting short-term weather changes, $$\Delta h_i = \frac{\partial h}{\partial (dP'_{si})} * \Delta P'_{si} = \frac{\Delta P'_{si}}{\rho_i * g}, \quad \text{[Equation 5]}$$

gives the change in true elevation associated with a change in corrected differential pressures, each corrected for any small changes in reference air 12 temperature, however negligible this correction may be for the road grade formulation of Equation 4.

Distance traveled horizontally during iteration i can be easily calculated knowing the vehicle speed $v_i$ and time elapsed between iterations, or during the iteration time dt. The vehicle speed $v_i$ is obtained from the GPS receiver 32, a vehicle's On-Board Diagnostics (OBD) data stream (not shown), or any other suitable speed measurement means available. The horizontal distance traveled between successive iterations, $\Delta x_i$ is given by:

$$\Delta x_i = v_i * dt,$$

and the road grade is given by:

$$\text{Road Grade} = \frac{\Delta h_i}{\Delta x_i} * 100\% = \frac{\Delta P'_{si}}{\rho_i * g * v_i * dt} \quad \text{[Equation 6]}$$

It should be noted that this equation does not depend upon, or reference in any way, the standard atmosphere or atmospheric conditions, except as its use as a convenient means for calculating actual air density at different temperatures and pressures, starting with the known air density at STP conditions. The true road grade calculated in the manner described above is in real, physical measurement units, for example vertical meters of elevation change per horizontal meter of travel. The same measurement value is reported, within a small experimental error, by the present invention independent of weather conditions and changes in weather over time or due to changes in vehicle location.

Whenever the differential pressure exceeds +/−90% of the full-scale value of the differential pressure sensor 13, e.g. +/−9" H2O for the +/−10" range sensor, or another chosen threshold, the vent valve 17 is briefly opened, programmatically, thereby resetting the reference air 12 pressure to approximately the current static atmospheric pressure. The "vented pressure" loss is accounted for by calculating the measured difference in corrected differential pressure immediately after each venting event, based on the corrected measurements made using the differential pressure sensor 13, due to one or more venting events, and modifying the above equation as follows:

$$\Delta P'_{si} = dP'_{si} - dP'_{si-1} + \Sigma dP'_{svi},$$

where the summation includes all venting events. In other words, the summation is the addition of all vented, corrected differential pressures, each corrected for any variation in the reference air 12 pressure within the reference pressure vessel 1 due to the net, accumulated effect of all heat transfer between the reference pressure vessel 1 and its surroundings, summed over all venting effects. It should be noted that venting may not be necessary, and therefore may not occur programmatically if the difference between the highest and lowest elevations attained, combined with any long-term change in reference pressure due to the effects described above, do not result in a differential pressure sensed by the differential pressure sensor 13 of more than approximately 9" H2O, in the case of a 10" H2O full range differential pressure sensor 13. This equates to an approximate net change in elevation of about 200 meters higher or lower than the starting point elevation for the "standard atmosphere." Or the venting process may need to be done numerous times if the terrain elevation changes by approximately 200 meters, multiple times. Using this venting process, a single, very low-range and sensitive differential transducer can be employed, thereby obtaining high measurement accuracy and high resolution of small changes in atmospheric pressure, from location to location, typical of the pressure changes experienced when sampling from a moving vehicle multiple times per second, while also allowing the vehicle to undergo large changes in elevation during a single test, without the need for any operator input once the measurement process has begun.

True Elevation Calculation

The true elevation during any iteration i, can be calculated as:

$$h_i = h_0 + \Sigma(\Delta h_i)_g$$

where g denotes that the general formulation for $\Delta P'_{si}$ is used to calculate $h_i$ to account for long-term weather changes over time and differences in weather between distant locations, otherwise those errors would accumulate and cause a significant error in reported true elevation over time and/or space. Using the general formulation, $$(\Delta h_i)_g = \frac{\partial h}{\partial (dP'_{si})} * (\Delta P'_{si} - \epsilon_{si}) = \frac{\Delta P'_{si}}{\rho_i * g} - \delta_i,$$

where $\delta_i$ represents the elevation error associated with iteration i, caused primarily by changes in weather over time and/or location. The elevation error can be continuously estimated as time progresses, or can be estimated as a function of time and location using either known elevation reference points or by using aggregate GPS location and elevation data from the GPS receiver 32. While the GPS receiver 32 data is not sufficiently accurate to report individual altitude and location data that can be used as reference points, the GPS receiver data 32 can be used to construct suitable reference elevations and locations.

There are numerous algorithms that could be employed for constructing suitable reference points from GPS receiver 32 data. One such algorithm used here is to selectively filter the reported GPS receiver 32 data sets as they are acquired, separating those data sets by a subset of the reported parameters that are indicative of the quality of the location fix, related to both elevation and horizontal position. In this way, a continuous, statistical correlation of location and elevation can be made programmatically, based on user inputs or filter value selections for choosing and continuously updating the GPS data subset used for the correlation.

The net effect of employing a reference elevation and location algorithm acting on the GPS receiver 32 data is that a high quality reference elevation and reference location are thus always available for statistically determining the true elevation error $\delta_i$. One way of employing this general concept is the following:

A time period is chosen that is sufficiently long to obtain a good average elevation fix, based on the quality and characteristics of the particular GPS receiver 32 employed, but sufficiently short to minimize the effects of changing weather. For example, for a time period of approximately 10 minutes, approximately 3000 GPS receiver 32 data sets can be received. This amount of time is sufficient to obtain a large number of high quality fixes, while also short enough to ensure the weather has not changed enough to significantly impact the correlation between an average true altitude based on the high-quality fixes and the absolute atmospheric pressure being measured indirectly, using the differential pressure sensor 13. During a "moving window" of time, e.g. 10 minutes, the GPS receiver 32 fix and quality data is collected and filtered based on the user-selected thresholds of GPS data quality parameters. For example, these parameters include, but are not limited to, Vertical Dilution of Precision (VDOP), Horizontal Dilution of Precision (HDOP), "Quality of Fix," "Number of Satellites" used in calculating fix, and "Time Since Last Differential Fix." For Wide Area Augmentation System (WAAS) GPS receivers it may be desirable to filter out and use only WAAS-based fixes in the continuous true altitude vs. atmospheric pressure correlation. Newly acquired GPS receiver 32 and differential pressure data sets that meet or exceed the threshold quality parameters are immediately entered into new database records of "reference calibration points," along with their original time of acquisition. Old database records are continuously deleted as they expire, or become older than the desired time period, in this example, 10 minutes. This ensures that only recently acquired GPS receiver 32 data of the highest or chosen quality threshold is used to continuously estimate the elevation error and determine an automated adjustment to minimize the error on a continuous basis. This automated procedure is analogous to the manual "altimeter setting" procedure used by pilots and the Air Traffic Control system to keep aircraft coordinated and separated in space, except that it results in true altitude rather than an agreed upon by convention, indicated altitude.

More specifically, in this particular example, for the first 10 minutes of a drive, the formula $h_i = h_0 + \Sigma \Delta h_i$ will be very accurate because the weather will not have changed significantly in the short time period nor will the location have changed significantly. Sometime after the initial 10 minutes, however, $\Sigma \delta_i$ is likely to accumulate to a significant net value because of changes in the atmospheric air column above the vehicle and most probably needs to be taken into consideration in calculating the true elevation accurately. One algorithm for doing this is summarized by the following expression:

$$b_i = \Sigma \delta_d / d = (\Sigma(\Delta h_d)_{GPS} - \Sigma(\Delta h_d)_{dP})/d,$$  [Equation 7]

which denotes the average true elevation error, or difference between the GPS receiver 32 elevation value and the elevation calculation based on the differential pressure sensor 13 according to equation 5, when considering only the currently valid "reference calibration points" comprising the stored "calibration database" subset of data algorithmically selected based on user input criteria, i.e. calibration points 1 through d. The user input criteria are used to identify the highest quality GPS fixes to be used in obtaining a very good estimate of the true elevation as time and location change, thereby continuously and programmatically correcting the elevation calculation that is based on differential pressure alone (equation 5), by applying the offset b as defined above. Functionally, the application of the offset b is analogous to a pilot manually updating his/her "altimeter setting" on a regular basis, as mentioned above.

Therefore, the reference-calibrated, true elevation $h_i$ of the vehicle during iteration i is given by:

$$h_i = h_0 + \Sigma \Delta h_i + b_i.$$  [Equation 8]

Figure 3A:
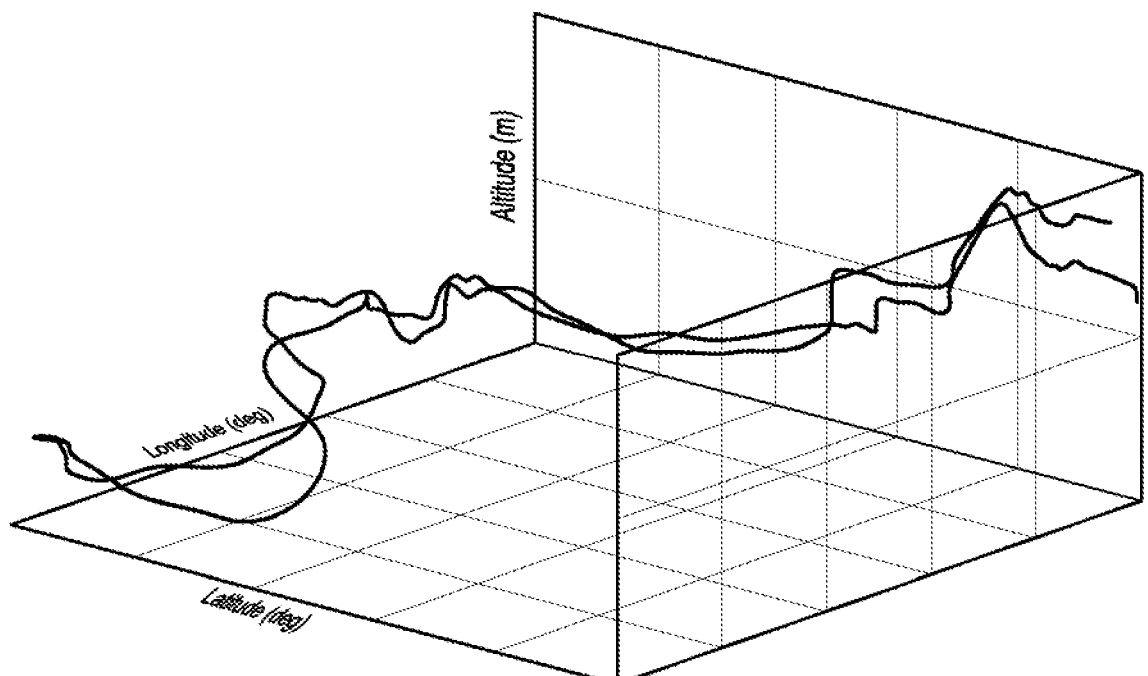
FIG. 3 is a graph showing actual data reported by the apparatus shown in FIG. 1 which demonstrates the improved quality of true elevation data compared with using a GPS receiver's reported elevation data in a conventional manner.
Figure 3B:
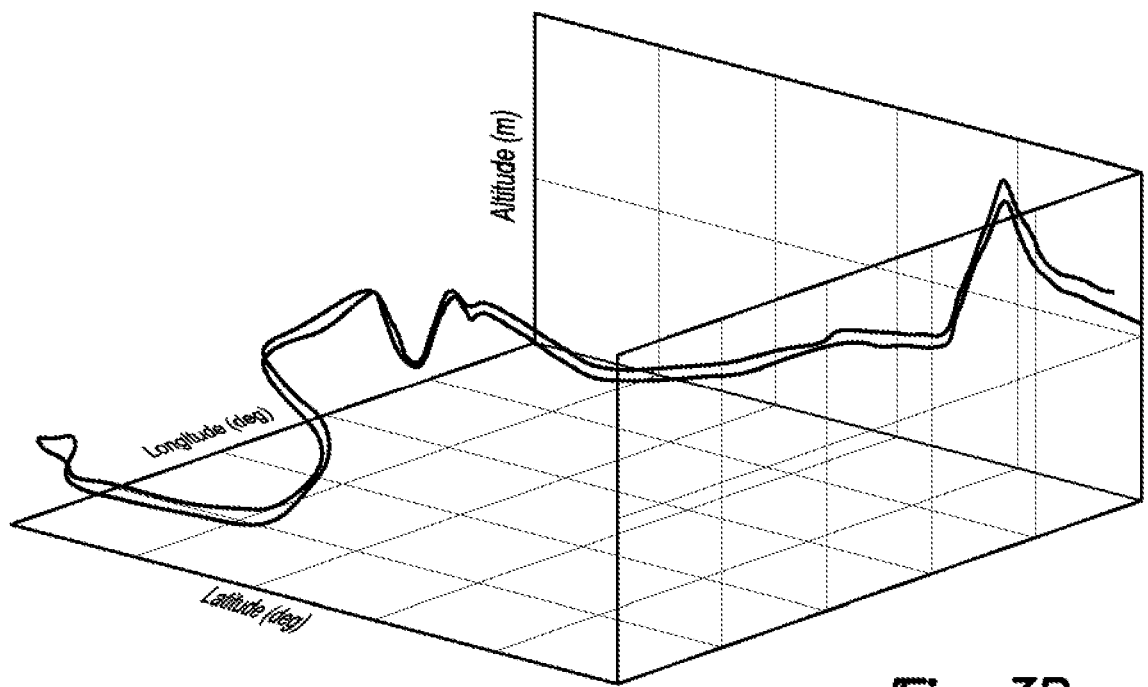

The plots shown in FIG. 3A and FIG. 3B both display actual elevation data on their respective z-axes vs. the reported latitude and longitude on the horizontal axes, reported at a rate of 5 Hz. The data was collected during a real-world road drive of approximately 5 miles in one trip direction comprising a combination of two-way streets, followed by a return trip on the same streets but traveling in the opposite lane. It is to be expected that the measured elevations would be nearly equal to each other, with only a minor dependence on which lane was used (since these city streets are crowned, with one lane slightly higher than the other). FIG. 3A elevation data is directly from a GPS receiver, while FIG. 3B elevation data is reported by the novel apparatus of FIG. 1, following the method shown in FIG. 2. The latitude and longitude data are reported by the GPS receiver in both cases. It can be seen that the GPS elevation data from the GPS receiver is significantly different at essentially the same geographic location while traveling in one direction vs. the opposite direction. It is readily seen in FIG. 3B that the present invention leads to significantly improved reporting of elevation data as evidenced by the elevation data being much more consistent, from one direction of travel and one lane to the other.

FIG. 4 is illustrative of the process for using the real-world road grade and associated weather station 30 data from the apparatus shown in FIG. 1 to provide an improved laboratory simulation of the road load actually experienced by a vehicle during a prior real-world drive. During a real-world drive, atmospheric pressure, humidity, temperature, and the magnitude of the headwind or tailwind are determined by the weather station data as described above. At the same time, the real-time vehicle ground speed and road grade are continuously determined, also described above.

With reference to FIG. 5, an "atmospheric conditions simulator" 57, recently made available by an emissions testing equipment manufacturer is employed in an otherwise standard emissions testing laboratory, rather than employing a more capital intensive environmental testing chamber, which could also be used. This allows the use of a standard emissions test cell 51. The ambient air conditions previously recorded during the real-world drive are simulated by the environmental conditions simulator 57 which is also moveable and can be shared with other test cells. The simulator 57 is connected to the vehicle 101 intake air system of the vehicle's engine 103 by the intake air hose 126 and to the vehicle's tailpipe 120 by the exhaust gas hose 127, whereby the simulator 57 controls the intake air pressure and the exhaust backpressure programmatically to mimic the conditions recorded during the prior real-world drive, while the load on the vehicle from the electric dynamometer 110 is properly set to simulate the combined effect of the vehicle road load based on the measured ground speed, road grade, and the headwind or tailwind from the real world driving as described above. The dynamometer settings are made using the dyno control 111 according to established procedures. The humidity of the intake air is also controlled and either a PEMS emissions measurement system 104 or standard laboratory emissions measurements 114 are made to document the emissions and fuel economy performance of the vehicle under the simulated environmental conditions.

A variable speed fan 125 provides powertrain cooling and is controlled using either the recorded vehicle ground speed or, preferably, with the measured wind speed that was recorded using the weather station during the on-road drive.

The vehicle ground speed 118 from the real-world drive is input to the robotic driver 113 or other suitable vehicle speed control means, e.g. an electronic throttle control signal to obtain the real-world ground speeds. The net result is a more realistic simulation of the real-world drive in the laboratory.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and any claims.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An apparatus comprising:
   a hermitically sealed rigid vessel;
   a differential pressure sensor arranged to measure a difference between ambient pressure in a vicinity of the vessel and internal pressure in the vessel, and to output a signal indicative of the difference; and
   a controller programmed to compute a change in elevation of the apparatus between a first location and a second location based on a value of the signal associated with the first location and a value of the signal associated with the second location.

2. The apparatus of claim 1, wherein the controller is further programmed to open and close the vessel prior to measuring the difference between ambient pressure in a vicinity of the vessel and internal pressure in the vessel.

3. The apparatus of claim 1, wherein the controller is further programmed to open and close the vessel responsive to a value of the signal exceeding a predefine threshold value.

4. The apparatus of claim 1 further comprising a temperature sensor arranged to measure a temperature in the vessel, wherein the controller is further programmed to compute the change in elevation based on the temperature.

5. The apparatus of claim of claim 1 further comprising a temperature sensor arranged to measure a temperature in the vicinity of the vessel, wherein the controller is further programmed to compute the change in elevation based on the temperature.

6. The apparatus of claim of claim 1 further comprising a humidity sensor arranged to measure a humidity in the vicinity of the vessel, wherein the controller is further programmed to compute the change in elevation based on the humidity.

7. The apparatus of claim 1 further comprising a heat sink contained by the vessel.

8. The apparatus of claim 7, wherein the heat sink includes metal balls.

9. The apparatus of claim 1, wherein the vessel is insulated.

10. The apparatus of claim 1 further comprising a conduit with open ends configured to permit ambient air to flow therethough and defining a port on a wall thereof in fluid communication with the differential pressure sensor.

11. The apparatus of claim 10, wherein the conduit is oriented in a direction of travel of the apparatus.

12. The apparatus of claim 1, wherein the hermitically sealed rigid vessel, differential pressure sensor, and controller are configured to be mounted to a vehicle.

13. The apparatus of claim 1, wherein the controller is further programmed to compute road grade based on the change in elevation and a distance travelled between the first and second locations.

14. The apparatus of claim 1, wherein the controller is further programmed to compute an actual elevation based on an initial elevation and the change in elevation.

15. An apparatus comprising:
    a straight conduit attachable to an outside of a vehicle, having open ends oriented in a longitudinal direction of the vehicle, defining a static port, and having an internal diameter and length between any one of the open ends and the static port that precludes a straight line path between any one of the open ends and the static port.

16. The apparatus of claim 15 further comprising a pressure sensor in fluid communication with the static port.

17. The apparatus of claim 15 further comprising a differential pressure sensor in fluid communication with the static port.

18. The apparatus of claim 15 further comprising a temperature sensor arranged to measure a temperature in a vicinity of the conduit.

19. The apparatus of claim 15 further comprising a humidity sensor arranged to measure a humidity in a vicinity of the conduit.

20. A method for calculating true elevation comprising:
    selecting a reference elevation;
    calculating an elevation change based on a measured pressure; and
    calculating an estimated true elevation error performed on a subset of elevation data reported by a global positioning receiver, the subset selected based on parameters reported by the global positioning receiver.

* * * * *